United States Patent [19]
Applebaum et al.

[11] 3,786,509
[45] Jan. 15, 1974

[54] AUTOMATIC CANCELLER

[75] Inventors: Sidney P. Applebaum, Liverpool; James C. Kovarik, North Syracuse, both of N.Y.

[73] Assignee: General Electric Company, Syracuse, N.Y.

[22] Filed: Nov. 21, 1962

[21] Appl. No.: 239,875

[52] U.S. Cl. .............................. 343/17.1, 343/7.7
[51] Int. Cl. .............................................. G01s 9/42
[58] Field of Search ................ 343/100.7, 7.7, 17.1; 235/181; 325/473, 474, 475, 476

[56] References Cited
UNITED STATES PATENTS
2,908,812  10/1959  Laurent .............................. 343/17.1

*Primary Examiner*—Benjamin A. Borchelt
*Assistant Examiner*—G. E. Montone
*Attorney*—Frank L. Neuhauser, Oscar B. Waddell, Carl W. Baker and Melvin M. Goldberg

EXEMPLARY CLAIM

1. In a processor for eliminating undesired signals from among a plurality of desired signals, means including a first terminal for receiving all said signals, means including an adder and a first circuit for transmitting all said signals from said first terminal to said adder to produce residue signals, means including a delay line and a second circuit for transmitting all said signals from said first terminal through said delay line to produce delayed signals, cross correlator means coupled to receive said residue signals and said delayed signals, said cross correlator serving to multiply said residue signals and said delayed signals and to integrate the product to provide a control signal, mixer means receiving said control signal and said delayed signals and generating a correcting signal with phase and amplitude adjusted to cancel undesired signals, and means for transmitting said correcting signal to said adder to cancel said undesired signals, said adder thereby providing improved residue signals substantially free of undesired signals.

11 Claims, 10 Drawing Figures

DOPPLER FREQUENCY OF SIGNALS
OR VELOCITY OF TARGETS

INVENTORS:
SIDNEY P. APPLEBAUM,
JAMES C. KOVARIK,

BY Delbert P. Warner
THEIR ATTORNEY.

INVENTORS:
SIDNEY P. APPLEBAUM,
JAMES C. KOVARIK,

BY Delbert P. Warner
THEIR ATTORNEY.

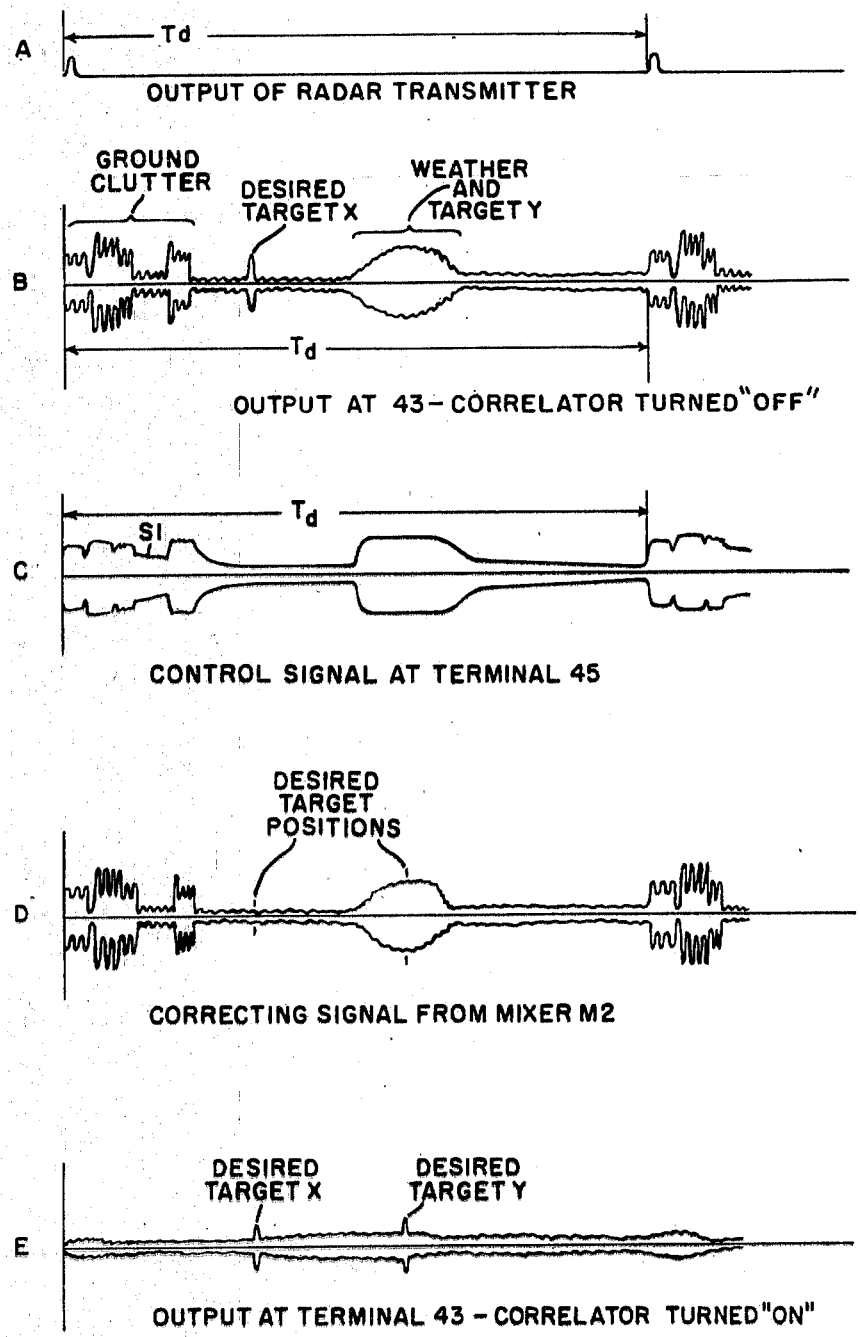

AUTOMATIC CANCELLER

The present invention relates to means for eliminating undesired signals from among desired signals and in particular to self-adapting filters which sense the presence of undesired signals and automatically cancel these signals to leave only desired signals.

The prior art devices which appear to be most clearly related to the present invention are Moving Target Indicator Cancellers or MTI cancellers. Such cancellers may be used for cancelling undesired radar signals including signals from targets in the following categories:

ground clutter — reflections from the surrounding terrain such as hills, trees, etc.

sea returns — reflections from the surface of the sea weather returns — reflections from clouds, rain, snow, etc.

chaff return — reflections from strips of foil dropped by aircraft for the purpose of producing a large number of false targets.

Each of these undesired targets can reflect a radar signal which exhibits a doppler shift, if there is relative velocity between the undesired target and the radar. The doppler shift on a ground-based system, i.e. a radar which is stationary, is usually zero for ground clutter and sea returns, but generally is not zero for weather and chaff returns. Also, each of these targets is usually characterized by the fact that it has large range extent, or depth in the range dimension, which results in the radar return signals being appreciably longer in time than the return signals from a desired target having only shallow range extent, such as an airplane.

MTIs provide for cancellation of undesired signals for making use of the doppler characteristics of undesired signals. This is done in the prior art by storing or delaying the signal received from a target and combining it with the next signal obtained from the target in such a way that if the signal has a pre-selected doppler shift, it is cancelled. MTI cancellers are usually set up to cancel signals having the same doppler shift as does the ground clutter (zero doppler on ground-based systems), and therefore perform best against ground clutter and sea returns and generally are not effective against weather and chaff returns which usually exhibit a doppler shift appreciably different from that of ground clutter. The present invention overcomes this limitation by making use of a common characteristic of all of the aforementioned undesired targets. That is, it makes use of the fact that they all have large range extent (depth in the range dimension) which distinguishes them from desired targets, such as aircraft, which have small range extent. This difference in range extent is clearly evident in the reflected pulses from undesired targets which tend to be of long, or long time, duration sometimes several pulse lengths, as compared with the reflected pulses from desired targets which tend to be of shorter, or short time, duration and usually are only one pulse long. The present invention eliminates the undesired target signals by cancelling them and leaving the desired target signals for further processing.

An additional limitation of the piror art MTIs is that they require that successive return signals be of good phase coherence before cancellation can take place. This requirement of good phase coherence is difficult to satisfy because many transmitting devices, such as magnetrons, are not phase stable and require special circuitry to assure phase coherence. Also in the case of moveable platforms, as in airborne equipment, it is necessary with the prior art to provide special circuits to compensate for phase shifts due to the velocity of the platforms. These difficulties with phase coherence are overcome by the present invention which provides means for adjusting the phase and amplitude of a correcting signal so that it is of a phase and amplitude to cancel undesired signals even though they exhibit poor phase coherence.

A further limitation of the prior art system stems from the fact that they cancel only stationary targets or targets moving at a prescribed velocity with respect to the radar. This means that desired targets moving tangentially around the radar or at particular angles to a tangent may appear to have zero velocity, or whatever velocity is being cancelled, and special provisions are required to prevent their cancellation. Usually a range gating circuit is used to make the MTI effective only for a short distance from the radar. This permits cancellation of ground clutter and sea returns, but prevents the cancellation of tangentially moving targets or targets having a radial velocity component equal to a blind speed of the radar at distances beyond the range gate. The present invention overcomes this problem by use of its amplitude control characteristic and special range gate circuitry is not required.

With the limitations of the prior art in mind, it becomes a primary objective of the present invention to provide an automatic canceller which is self-adjusting so that it may eliminate a variety of undesired signals.

It is a further object of this invention to provide an automatic canceller capable of distinguishing between long-duration signals from range-extended targets and short-duration signals from point targets and of cancelling the long-duration signals.

It is yet another object of this invention to provide an automatic canceller which can self-adjust its filter notches to filter out or cancel various types of undesired signals.

It is still another object of this invention to provide a selfadapting filter for use in eliminating undesired signals where the signals have poor phase coherence.

It is yet an additional object of this invention to provide an extended target signal canceller which is doppler-frequency sensitive so that signals from desired targets at the same range as an extended target, but which have a different doppler frequency, are not cancelled.

It is still an additional object of this invention to provide a signal canceller for cancelling signals from targets which are extended in range, regardless of the doppler frequency of the signals.

The foregoing objects and other ancillary thereto may be accomplished in a preferred embodiment of the invention through the processing, at intermediate or IF frequencies, of signals which are amplitude modulated according to radar reflections from desired and undesired targets. The signals are supplied to a common input terminal connecting to a main channel and to an auxiliary channel of the invention. The main channel is coupled through a heterodyning circuit for altering the IF frequency of the received signals, to an adder circuit for combining the altered signals with a correcting signal from a mixer in the auxiliary channel, and through an output terminal of the adder to one input terminal of a correlator. The auxiliary channel is coupled through a suitably-chosen time delay line (usually one pulse repetition period long) to an output terminal which in turn is connected by a first connector to the mixer from which the correcting signal is provided and by a second connector to a second input terminal of the correlator. The input signals to the correlator are of different frequencies due to heterodyning action in the main channel and are multiplied to produce a signal at their frequency. This signal is then filtered in a narrow band filter to produce a control signal which is supplied to the mixer used in generating the correcting signal. This correcting signal, the product of the delayed signal from the auxiliary channel and the output, or control, signal of the correlator, will in this process be adjusted in phase and amplitude such that when it is linearly combined with the main channel signal in the adder circuit to close a loop between the adder, the correlation network and the correcting signal mixer it will provide for continuous cancellation of undesired signals of relatively long duration which originally were present in the IF signals supplied to both channels.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 5 is a series of diagrams showing relationships between some of the signals of interest in the invention.

Figure 1:
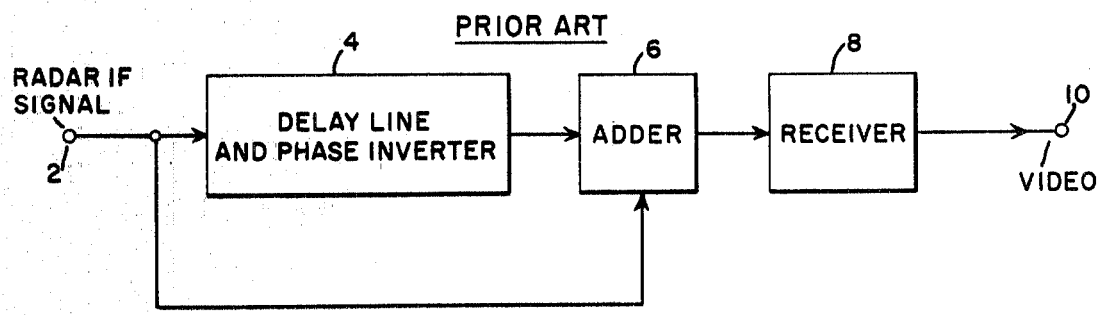
FIG. 1 is a block diagram illustrating prior art.

Turning to FIG. 1 we find a block diagram illustrating exemplary Moving Target Indicator or MTI Canceller circuitry of the prior art. In FIG. 1, a radar IF or intermediate frequency signal is supplied to a terminal such as 2 and from there through a delay line such as 4 to an adder at 6. The circuit in block 4 usually includes, as indicated, a delay line and phase inverter providing a delay $T_d$ equal to one pulse repetition period. The signal from the delay line is combined in the adder 6 with the signal from the input terminal 2, but since there is a delay $T_d$ in the delay line 4, the pulse from terminal 2 will be added to a pulse received $T_d$ units of time earlier at the input of the delay line. The adder 6 functions in conjunction with the delay line and a phase inverter to produce a null when two successive pulses are received such that they will be 180° out of phase following passage of one of them through the delay line. Such phase coherence between successive pulses will occur with the signals from stationary objects, if the delay line in one pulse repetition period long.

Figure 2:
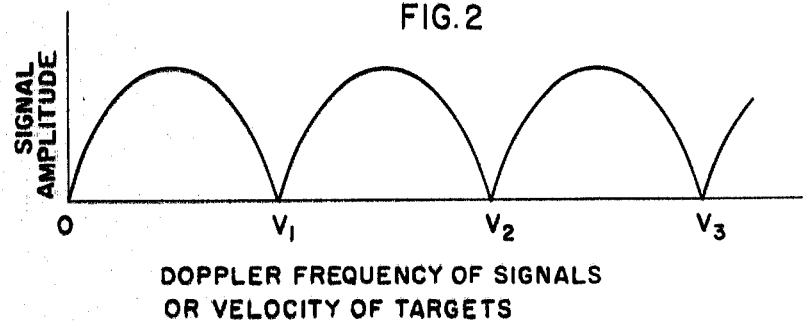
FIG. 2 is a graph illustrating the frequency response of the prior art and of the present invention.

The diagram of FIG. 2 is provided to help in explaining the operation of the prior art device as well as in showing some of the differences between the prior art device as well as in showing some of the differences between the prior art and the present invention. As applied to the circuit in FIG. 1, the diagram in FIG. 2 shows the static response characteristics of an MTI where the amplitude of the output signal of the MTI is plotted against the doppler frequency of received signals. It will be recognized that the doppler frequency is a function of the radial velocity of the targets from which the signals are reflected. As shown in FIG. 2, the response characteristics include a number of points of low response which are variously called null points or notches. These null points or notches represent the values of doppler frequency at which the signals are cancelled by action of the MTI. These signals exhibit either zero doppler shift, so that successive pulses are shown cancelled as at the origin O or some value of doppler shift corresponding to blind speeds $V_1$, $V_2$, or $V_3$. The present invention may also be analyzed as to some of its functions by a chart like that in FIG. 2. However, the present invention is dependent upon sensitivity to extended targets (as well as doppler effect) to provide for cancellation of undesired signals. As a result of this use of extended target information, the present invention is able automatically to provide a shift in the nulls or notches to cancel undesired targets. Therefore, FIG. 2 applies to the present invention only to the extent it is recognized that with this invention the notches O, $V_1$, $V_2$, $V_3$ etc. will shift automatically to provide cancellation of signals from extended targets regardless of the velocity of those targets.

Figure 3:
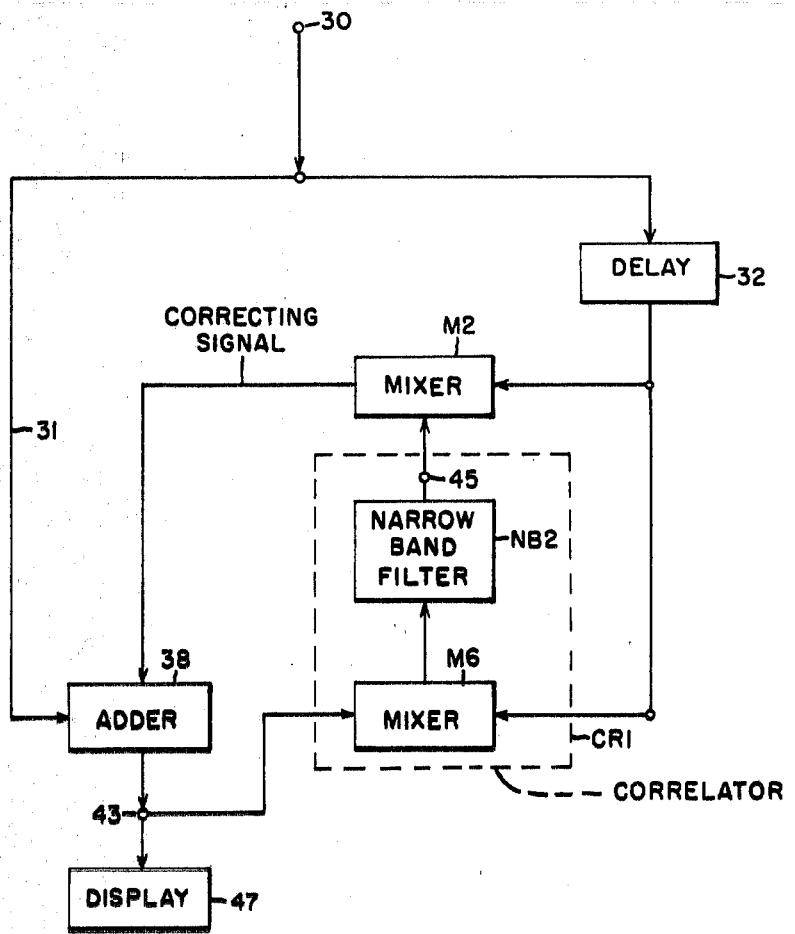
FIG. 3 is a block diagram showing a preferred embodiment of the invention.

The operation of an embodiment of the present invention as exemplified by the circuit of FIG. 3 may be understood in general terms by a brief description of what takes place following the receipt of a periodic train of radar IF signals from the same extended range target at a terminal 30. The first signal, which may be a noise-like train of individual reflected signals, is stored in a delay line 32 for a period of time equal to $T_d$, where $T_d$ is a period of time equal to the period between radius pulses ($T_d = 1/PRF$). The resulting delayed signal is then correlated in CR1 with the next return signal from the target which arrives at CR1 through the line 31, adder (or subtractor) 38 and terminal 43. If correlation between these two signals is present over a period of time longer than the response time of the IF correlation loop, a control signal will be supplied by the correlator to the mixer M2 and the amplitude and phase of the delayed return will be adjusted so that the delayed target return may be used to cancel the undelayed target return. The correlation process is performed in the correlator CR1 by multiplying the delayed target signal by the undelayed target signal in a mixer M6 and integrating the resulting product by passing the output of the mixer through a narrow band filter NB2. The amplitude and phase of the delayed target signal from the delay line 32 are then corrected for use as a cancellation signal by mixing the delayed target signal and the output signal of the IF correlation process in a mixer M2. The corrected delayed target signal, or corrected signal, which results is then subtracted in an adder 38 from the undelayed target signal from the terminal 30 to cancel any signals which may be present from undesired targets, i.e. signals from targets having extended range.

As has been explained in the preceding paragraph, the correlator CR1 and the mixer M2 function to receive selected signals and to generate a correcting signal having desired phase and amplitude. A similar circuit for generating a correcting signal for use in a different context is described in detail in the copending application of Paul W. Howells, Ser. No. 810,961, filed on May 4, 1959 and assigned to the same assignee as is the present invention.

In order to better understand the operation of this invention it should be recalled that signals reflected from desired targets, such as aircraft or missiles, will generally be short, i.e. of the order of one pulse length whereas signals reflected from undesired targets are longer, i.e. of more than one pulse length. Furthermore, it will be recognized that in order to get a signal from the output of a correlator which may be used in selective cancellation there must be substantial correlation between the input signals to the correlator. Consequently, it is clear that if a small pulse is received at terminal 30 and presented through the delay line 32 to one terminal of the mixer M6 and another small pulse is present one pulse repetition period later at terminal 30 and is passed through line 31, adder 38 and terminal 43 to the other terminal of mixer M6 the two pulses will correlate, but they will not produce a control signal at the output of the NB filter large enough to effect cancellation if the pulse length is short relative to the response time of the canceller. Another way of expressing this is by saying that the response time of the correlation loop must be adjusted so that short duration target returns, or those returns which have a length approximately equal to the transmitted pulse, produce insufficient control signals and are not cancelled. Signals having long return or those having a length greater than that of transmitted pulses, and which therefore come from targets which have greater range extent, produce strong control signals and are cancelled. The response time of the loop is a function of the loop gain and the bandwidth of the narrow band filter NB2. Loop gain in turn depends on such factors as the characteristics of components in the loop such as the limiter 42 shown in FIG. 4, which determines the functional relationship of gain to input power or voltage. This idea of selective cancellation can also be expressed by saying that the correlation circuit and attendant loops together have a sufficiently slow response to prevent cancellation of desired short duration signals.

The stability of the IF correlation loop to adjust both the amplitude and the phase of the delayed target return allows the present invention to operate with a radar system in which pulse-to-pulse coherence is much less than the required by the prior art MTI Cancellers and by coherent integration techniques. Consequently, one of the principle requirements for the operation of the prior art devices may be relaxed, since in the present invention the transmitter is required only to be sufficiently stable so that there is not a change in frequency from pulse-to-pulse by an amount large enough to prevent the correlation product of successive pulses from passing through the narrow band filter NB2. This flexibility is also of advantage in the use of airborne equipment, since it makes it unnecessary to use, in many instances, special circuits to overcome the effects of doppler shift due to motion of the radar platform.

Figure 4:
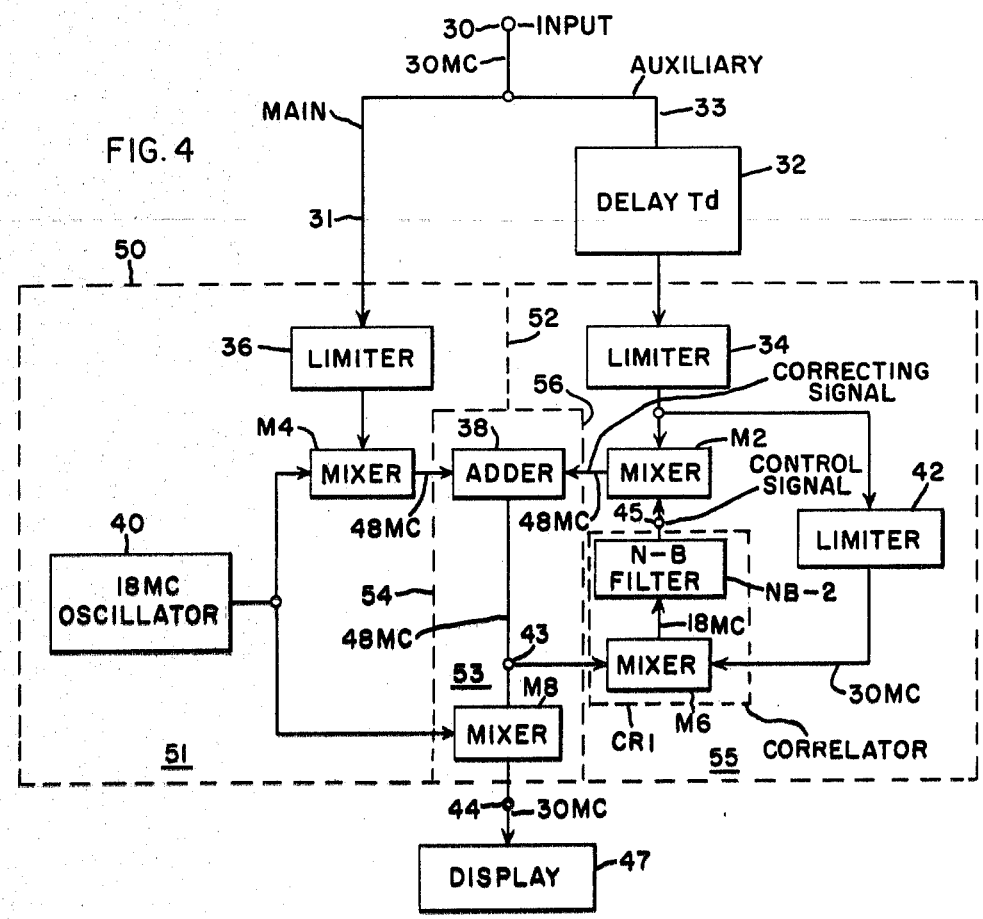
FIG. 4 is a block diagram illustrating further details of an embodiment of the invention.

Turning now to FIG. 4, corresponding parts of which are numbered like FIG. 3, we will consider the invention in more detail and also consider what would happen in a typical example if signals of particular IF frequencies were processed, it being understood that the frequencies employed are merely exemplary and that signals carried at other frequencies may be used. Consider that a signal such as that shown in FIG. 5B having an IF or carrier frequency of 30 megacycles (30MC) was supplied at terminal 30 and from there through the main and auxiliary channels via lines which have been labeled 31 and 33. A delayed signal produced by action of the delay line is supplied to a peak signal limiter 34. The 30 MC signal is also supplied as an undelayed signal through line 31 to a peak signal limiter designated by block 36. The undelayed signal is supplied from the limiter 36 to a mixer M4 where it is mixed with an 18 megacycle signal from an oscillator 40 to provide a 48 MC signal which is transmitted to an adder 38. The adder 38 may also be said to function as a canceller in the sense that it cancels undesired signals. The delayed signal transmitted by the limiter 34 is supplied to a mixer M2 and also through another limiter 42, which determines the functional relationship of feedback gain to input power or voltage, to a mixer M6. Up to this point the signal supplied through the delayed circuit has been a 30 MC signal. The delayed signal is mixed in a mixer M6 with a 48 MC residue signal supplied through terminal 43 from the adder 38, where the residue signal is the undesired signal left over after the correcting signal has been subtracted. The residue signals from range extended targets are rapidly reduced by action of the loop. The mixer M6 is set to provide an output signal having a center frequency equal to the difference in frequency between the two input signals or 18 MC. This 18 MC signal is passed through the narrow band filter NB2 which completes the cross correlation to provide a signal previously called a "control" signal at a terminal 45. This control signal is typically of the form shown in FIG. 5C and is composed of the 18 MC carrier signal modulated by the envelope shown. The signal has the proper amplitude and phase so that, when the control signal is mixed in the mixer M2 with the delayed signal, the output of the mixer M2 of correcting signal will be made equal in amplitude and of opposite phase to the undesired signal from the main channel mixer M4. These two signals will then cancel in the adder, eliminating undesired signals, and leaving only desired signals of short duration time to be supplied to the mixer M8 where their carrier will be reconverted to 30 MC by heterodyning action and then supplied to a terminal such as 44. From terminal 44 the signal may be supplied to operate various displays at 47.

Returning now to consideration of further details of the control 18 MC signal at terminal 45, it will be apparent that it is derived from correlation by mixing, in the mixer M6, the delayed 30MC signal from the limiter 42 and the 48 MC residue signal from the adder 38, and filtering the modulation product in the narrow band filter NB2. When the delayed 30 megacycle signal and the 48 megacycle residue signal have identical signal components, there is a one-to-one correspondence between each pair of signal components in the two channels and their frequency separation is exactly 18 megacycles. However, in addition to the signals to be cancelled appearing in the two channels there are also beat frequencies from the mixer M6 which result from all the other components in the two channels. This is called correlation noise and may be filtered out by the narrow band filter NB2 which has an 18 MC center frequency and typically has a passband of 7 kc. The output 18 MC signal from the NB 2 filter is then of such an amplitude and phase that when mixed with the delayed signal in the mixer M2 it can provide a 48 MC signal to the adder 38 capable of cancelling signals indicative of extended targets or clutter.

The diagrams shown in FIG. 5 are exemplary of waveforms obtained during tests of an embodiment of the present invention. FIG. 5A shows typical pulses such as are supplied by a radar transmitter with the pulses separated by time periods $T_d$. FIG. 5B shows some IF signals representing reflections received by the radar from ground clutter, weather, and desired targets. The signals at FIG. 5B are substantially as they appear at terminal 43 in FIG. 4 with the correlator turned OFF. The result of correlating the signal of FIG. 5B and the signal as delayed through delay line 32 will appear at a terminal 45 in FIG. 4 and takes a form like that shown in FIG. 5C. The signal of FIG. 5C then may be used to control the amplitude and phase of the delayed IF signal in mixer M2 to provide a correcting signal such as is shown in FIG. 5D. This figure is similar to FIG. 5B, however, the following differences should be noted. Target X does not appear in the correcting signal since it is not present at the same time as an undesired signal (extended target) and the control signal (FIG. C) at the time of target X is approximately zero. Target Y will be present in the correcting signal (FIG. D) since it is present at the same time as the undesired signal and the control signal is not zero but has assumed the proper amplitude and phase to insure cancellation of the extended target. This correcting signal is then used in cancelling the undesired signal in the adder (or subtractor) 38 and to produce an output signal or residue signal at 43 from which extended target signals have been removed as shown at FIG. 5E. Target X is present because the control signal had eliminated it from the correcting signal (FIG. D) as previously described. Target Y will be present if its velocity differs from the velocity of the undesired target or blind velocities of the undesired target since the velocity difference will insure that the phase of target Y is not proper for cancellation at adder 38.

Several characteristics relating to this invention are observable in FIG. 5. The reflected signals from ground clutter and weather are of long duration as indicated in FIG. 5B and give rise to rather strong control signals due to action of the correlator CR1, as shown in FIG. 5C. At the same time it will be noted that desired targets, such as X and Y do not give rise to control signals in FIG. 5C and in FIG. 5D and therefore they remain in the output signals of the system as indicated at FIG. 5E. Target Y is particularly of interest, since it is shown to be concealed by weather, but the short pulse caused by it in reflected signals are such that no control signal is generated by them in the correlator. Consequently the control signal contains no signal related to target Y and the target Y signal remains uncancelled at terminal 43.

Among the characteristics of the present invention which are shown in FIG. 5 is that of the "memory" of the system. It will be noted in FIG. 5B that all slopes of the target signals tend to slope abruptly and that this is true whether the signal is rising or falling. The output of the correlator, as shown in FIG. 5C, has a fast lock-on time so that the rising slopes of the signals are abrupt, but it has a slow decay time as indicated by the more gradual decrease on the falling slopes of the curves. This characteristic is typical of the loop's transient behavior and enables the system to "remember" the phase of an extended target for a period of time so that it is prepared to cancel a similar target. This property is shown in FIG. 5C. In FIG. 5B, the first return of ground clutter is followed by a short period when no ground clutter appears to be present. This brief hiatus is bridged by the control signal of FIG. 5C, as indicated by the slope S1. The cancellation of undesired signals in FIG. 5E is thus made all the more complete, since a faster decay time along line S1 would otherwise result in an undesirable transient signal in FIG. 5E.

One of the chief advantages of the present invention is that cancelation of undesired signals will take place regardless of whether the undesired target is fixed or moving, providing only that any velocity component is reasonably uniform over a given number of range cells. This means, for example, that the invention can cancel fixed cutter which is near the receiver and as the range increases past the ground clutter or sea returns it will automatically adjust to cancel signals returned from weather or chaff, if either is present. If no undesired signals (signals with large range extent) are present, the control signal from the correlator CR1 becomes zero due to the lack of correlation between the signals from the adder 38 and those from the delay line 32 and no correcting signal is generated in the mixer M2 to be fed to the adder 38.

The circuit illustrated in FIG. 4 provides for very excellent cancellation of extended targets providing the velocity spread of the individual reflectors comprising the target is low. When there are two undesired extended targets at the same range having a substantial difference in velocity a single processor such as is indicated within the dashed lines 50 of FIG. 4 may not be able to adequately cancel both of the undesired target signals, nor will it always be able to handle three or more such undesired target signals where there is a large difference in respective velocities. In order to cancel multiple undesired targets, a plurality of processors arranged as indicated in FIG. 6 may be used.

Figure 6:
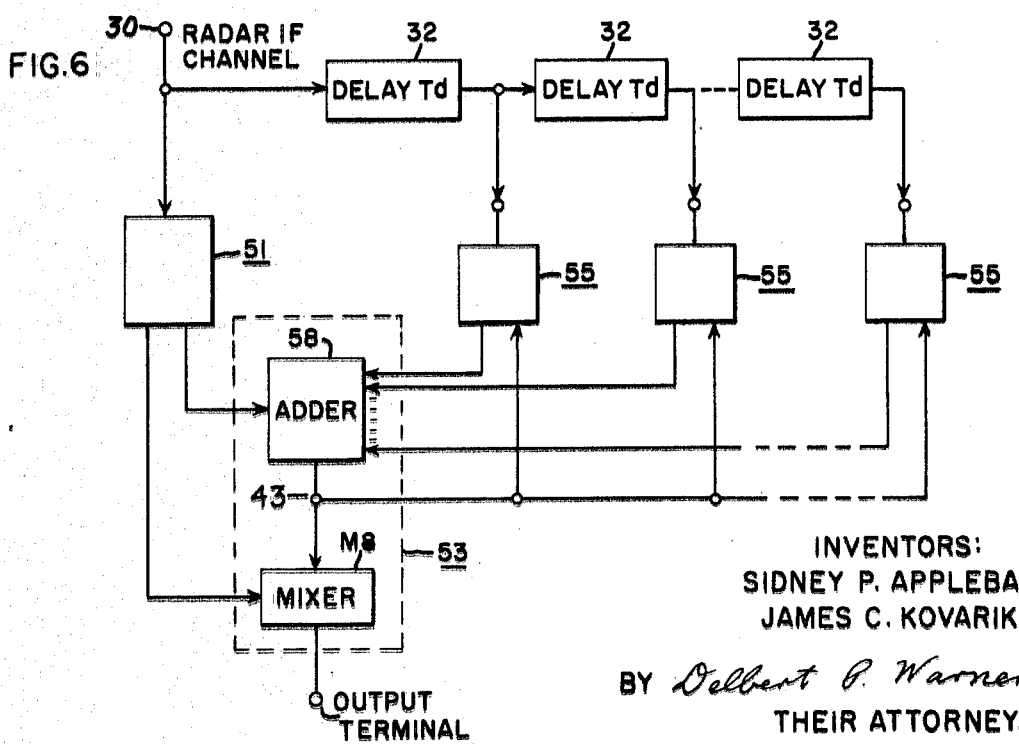
FIG. 6 is a block diagram showing an additional embodiment of the invention.

In FIG. 6 the processor which was indicated within the outer dashed line as 50 of FIG. 3 has been split into three kinds of segments 51, 53, and 55. This is shown in FIG. 4 by the dashed lines at 52, 54 and 56 which split the block 50, representing the processor, into three segments which are labeled 51, 53, and 55. Other elements in FIG. 6 which correspond to elements in FIG. 4 are numbered as they are in FIG. 4.

Briefly, the corresponding elements in FIG. 6 function in the same manner as explained with respect to FIG. 4. In FIG. 6, however, several delay lines of equal length may be used to delay separate undesired signals so that several undesired signals can be cancelled during the same period in an adder 58. The adder 58 functions much as does the adder 38 (FIG. 4) except that it utilizes several correcting signals at a time. In place of the plurality of delay lines 32 it is possible to substitute a recirculating delay line with supporting circuits such as are shown in the patent to Sidney Applebaum U.S. Pat. No. 2,997,650.

While particular embodiments of the invention have been illustrated and discussed, it will be understood that it is not intended to limit the scope of the invention thereto, since many modifications may be made. For example, it is clear to those skilled in the art that the objectives of the invention may be accomplished by using in-phase and quadrature video circuitry in place of the IF circuitry illustrated here. It is therefore contemplated by the appended claims to cover any such modifications as fall within the true spirit and scope of the invention.

What we claim as new and desire to secure by Letters Patent of the United States is:

1. In a processor for eliminating undesired signals from among a plurality of desired signals, means including a first terminal for receiving all said signals, means including an adder and a first circuit for transmitting all said signals from said first terminal to said adder to produce residue signals, means including a delay line and a second circuit for transmitting all said signals from said first terminal through said delay line to produce delayed signals, correlator means coupled to receive said residue signals and said delayed signals, said correlator serving to multiply said residue signals and said delayed signals and to integrate the product to provide a control signal, mixer means receiving said control signal and said delayed signals and generating a correcting signal with phase and amplitude adjusted to cancel undesired signals, and means for transmitting said correcting signal to said adder to cancel said undesired signals, said adder thereby providing improved residue signals substantially free of undesired signals.

2. In a processor for eliminating undesired signals from among desired signals where said desired and undesired signals respectively represent radar reflections from desired and undesired targets, a canceller including first and second input terminals, means for receiving the desired and undesired signals and supplying them to said first terminal of said canceller, a correlator, said canceller supplying residue signals to said correlator, means for receiving said desired and undesired signals and providing a time delay to produce delayed signals, a mixer, means for supplying said delayed signals to said mixer and to said correlator, said correlator multiplying the residue signals from said canceller by the delayed signals and integrating the product to provide a control signal, means for supplying said control signal to said mixer, said mixer mixing said control signal and said delayed signals to provide a correcting signal of the proper amplitude and phase to cancel said undesired signals, and means coupling said correcting signal to said second terminal of said canceller to provide for the elimination of said undesired signals.

3. In a processor for eliminating undesired IF signals from among desired IF signals where said undesired and desired signals respectively represent reflections of evenly separated radar pulses from undesired and desired targets, an input terminal for receiving all of said IF signals, means coupling said IF signals from said input terminal to a canceller, a correlator, means coupling an output signal from said canceller to said correlator, delay means, means coupling said IF signals from said input terminal to said delay means, said delay means providing a time delay to produce delayed IF signals, said time delay being substantially equal to the time between said separated radar pulses, means for supplying said delayed IF signals to said correlator, said correlator including means for multiplying the output signal from said canceller by the delayed IF signals from said delay means to provide a product signal, said correlator including means for integrating the product signal to provide a control signal, a mixer, means for coupling said control signal to said mixer, means coupling said delayed IF signals to said mixer, said mixer responding to said control signal and said delayed IF signals to provide a correcting signal of the proper amplitude and phase to cancel said undesired IF signals, and means coupling said mixer to said canceller to supply said correcting signal to cancel said undesired signals.

4. A self adapting filter for eliminating undesired signals from among desired signals comprising a first circuit including an adder and input and output terminals and means for coupling signals appearing on said input terminal through said adder to said output terminal, a second circuit including a delay line and a second output terminal and means for coupling signals appearing on said input terminal through said delay line to produce delayed signals at said second output terminal, a correlator means, including first and second input terminals coupling said first and second output terminals to respective input terminals of said correlator, said correlator generating a control signal in response to signals appearing on its input terminals, a mixer, means coupling said control signal to said mixer, means coupling said delayed signals from the second output terminal to said mixer, said control signal correcting the phase and amplitude of said delyaed signals to provide correcting signals of a phase and amplitude to nullify undesired signals in said first circuit, and means coupling said correcting signals to said adder to cancel undesired signals appearing in said first circuit.

5. A self adapting filter for cancelling undesired signals and passing desired signals, said undesired signals having long-time durations representing reflections of radar pulses having a constant pulse repetition period from targets having deep range extent, said desired signals having short-time durations representing reflections of said radar pulses having a constant pulse repetition period from targets having shallow range extent, said filter comprising a first circuit including an adder an input and output terminals and means for coupling signals appearing on said input terminal through said adder to said output terminal, a second circuit including a delay line and a second output terminal and means for coupling signals appearing on said input terminal through said delay line to produce delayed signals at said second output terminal, a correlator including first and second input terminals, means coupling said first and second output terminals to respective input terminals of said correlator, said correlator generating a control signal in response to like signals appearing on both said input terminals, a mixer, means coupling said control signal and said delayed signals from the second output terminal to said mixer, said control signal correcting the phase and amplitude of said delayed signals to provide correcting signals of a phase and amplitude corresponding to undesired signals in said first circuit, and means coupling said correcting signals to said adder to cancel undesired signals appearing in said first circuit.

6. A processor for cancelling long-time duration signals representing radar reflections of undesired targets having large range extent from among short-time duration signals representing radar reflections of targets having small range extent comprising, an input terminal for receiving said signals, an adder for accepting all the signals appearing on said input terminal, a correlator, means for supplying the output of said adder to said correlator, delay means having a time delay period substantially equal to the time between pulses of a transmitted radar for accepting all the signals appearing on said input terminal and providing delayed signals having a delay substantially equal to one radar pulse repetition period, a mixer, means for supplying said delayed signals to said mixer and to said correlator, said correlator generating a control signal in response to like signals from said adder and from said delay means, means for supplying said control signal to said mixer, said mixer providing a correcting signal of the proper amplitude and phase to cancel asid long-time duration signals, and means for supplying said correcting signal to the adder to cancel said undesired long-time duration signals.

7. A processor for cancelling long-time signals representing radar reflections of undesired targets having great range extent from among short-time signals representing radar reflections of targets having small range extent comprising, an adder for accepting all the signals, a correlator, means for applying the output of said adder to said correlator, delay means for accepting all the signals and providing a delay equal to one radar pulse repetition period to all the signals, a mixer, means for supplying said delayed signals to said mixer and to said correlator, said correlator generating a control signal in response to long-time signals supplied simultaneously from said adder and from said delay means, means for supplying said control signal to said mixer, said mixer providing a correcting signal of the proper amplitude and phase to cancel said long-time signals, and means for supplying said correcting signal to the adder to cancel said undesired long-time signals.

8. A processor for cancelling long-time signals representing reflections of radar pulses having a constant pulse repetition period from targets having deep range extent and for preserving short-time signals representing reflections of said radar pulses having a constant pulse repetition rate from targets having shallow range extent comprising, a correlator, an adder for accepting all the signals, means for supplying the output of said adder to said correlator, delay means for accepting all the signals and providing a delay substantially equal to one radar pulse repetition period to all the signals, a mixer, means for supplying delayed signals from said delay means to said mixer and to said correlator, said correlator generating a control signal in response to signals of the same form from said adder and from said delay means, means for supplying said control signal to said mixer, said mixer responding to said delayed signals and to said control signal to provide a correcting signal of the proper amplitude and phase to cancel said long-time signals, and means for supplying said correcting signal to said adder to cancel said undesired longtime signals.

9. A processor for cancelling long-time signals representing reflections made by equally spaced radar pulses from targets having great range extent and for preserving short-time signals representing reflections made by said equally spaced radar pulses from targets having small range extent comprising, an adder for accepting all the signals, a correlator, means for supplying the output of said adder to said correlator, delay means for accepting all the signals and providing delayed signals having a delay equal to the time between equally spaced radar pulses, a mixer, means for supplying said delayed signals to said mixer and to said correlator, said correlator generating a control signal in response to similar signals provided simultaneously from said adder and from said delay means, means for supplying said control signal to said mixer, said mixer providing a correcting signal of the proper amplitude and phase to cancel said longtime signals, and means for supplying said correcting signal to the adder to cancel said undesired long-time signals.

10. In a pulse echo receiving system, means to receive desired echoes of radiated periodic pulses from remote objects having short range depth such that the echo pulses produced thereby have duration about equal to the radiated pulse, while eliminating undesired echoes from reflectors of greater range depth which produce echoes of the character of ground clutter, and sea, weather, and chaff returns, etc. said means comprising an input circuit in which both said desired and undesired echoes are received, a correlator, means to transmit the received echoes from said circuit through two channels to said correlator, one of said channels including means to delay echoes transmitted through it by the period between successive radiated pulses, said correlator comprising means to multiply the output of said two channels and to integrate the product, said correlator having a response time greater than the duration of desired echo pulses to be received, whereby a correction wave is produced corresponding to said undesired echoes, but free of desired echoes, and means to apply said correction wave to the other of said channels to reduce undesired long range echoes therein while not reducing desired short range depth echoes.

11. In a pulse echo receiving system, means to receive desired echoes of radiated periodic pulses from remote objects having short range depth such that the echo pulses produced thereby have duration about equal to the radiated pulse, while eliminating undesired echoes from reflectors of greater range depth which produce echoes of long range depths of the character of ground clutter, and sea, weather, and chaff returns, etc. said means comprising an input circuit in which both said desired and undesired echoes are received, a correlator, means to transmit the received echoes from said circuit through two channels to said correlator, one of said channels including means to delay echoes transmitted through it by the period between successive radiated pulses, said correlator comprising means to multiply the output of said two channels and to integrate the product, said correlator having a response time greater than the duration of desired echo pulses to be received, whereby a correction wave is produced corresponding to said undesired echoes, but free of desired echoes, and means for combining said correction wave with the delayed output of said one channel and applying the result to the other of said channels to reduce undesired long range depth echoes therein while said other channel continues to transmit desired short range depth echoes, and output load means responsive to said desired short range depth echoes.

* * * * *